No. 715,642. Patented Dec. 9, 1902.
A. W. CURTIS.
CLAMPING DEVICE FOR CUTTING CLOTH.
(Application filed Apr. 19, 1902.)
(No Model.) 3 Sheets—Sheet 1.
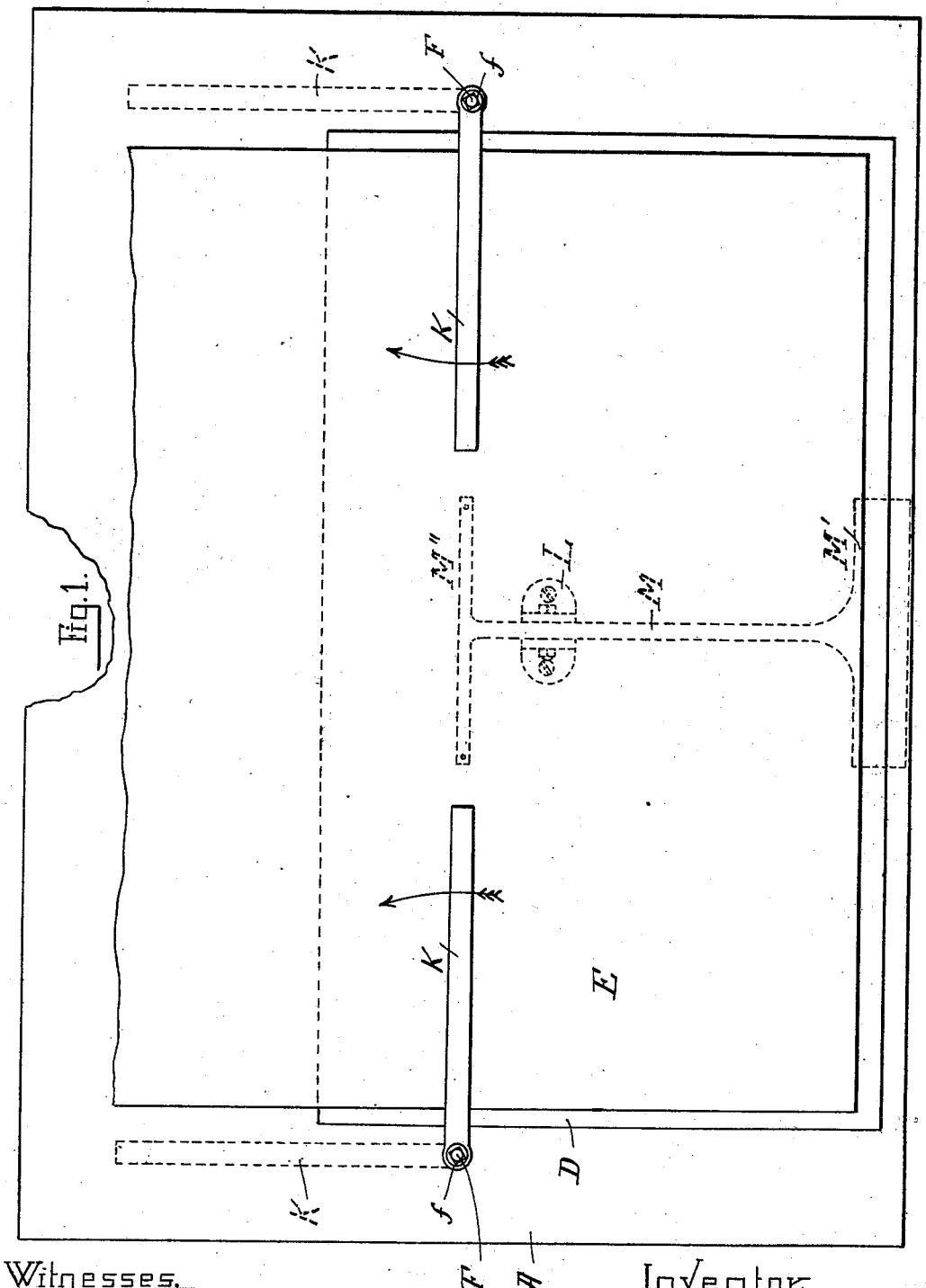
Witnesses.
Lauritz N. Möller
Anna B. Hammerich
Inventor
Arthur W. Curtis
by H. van Andrén
his atty.

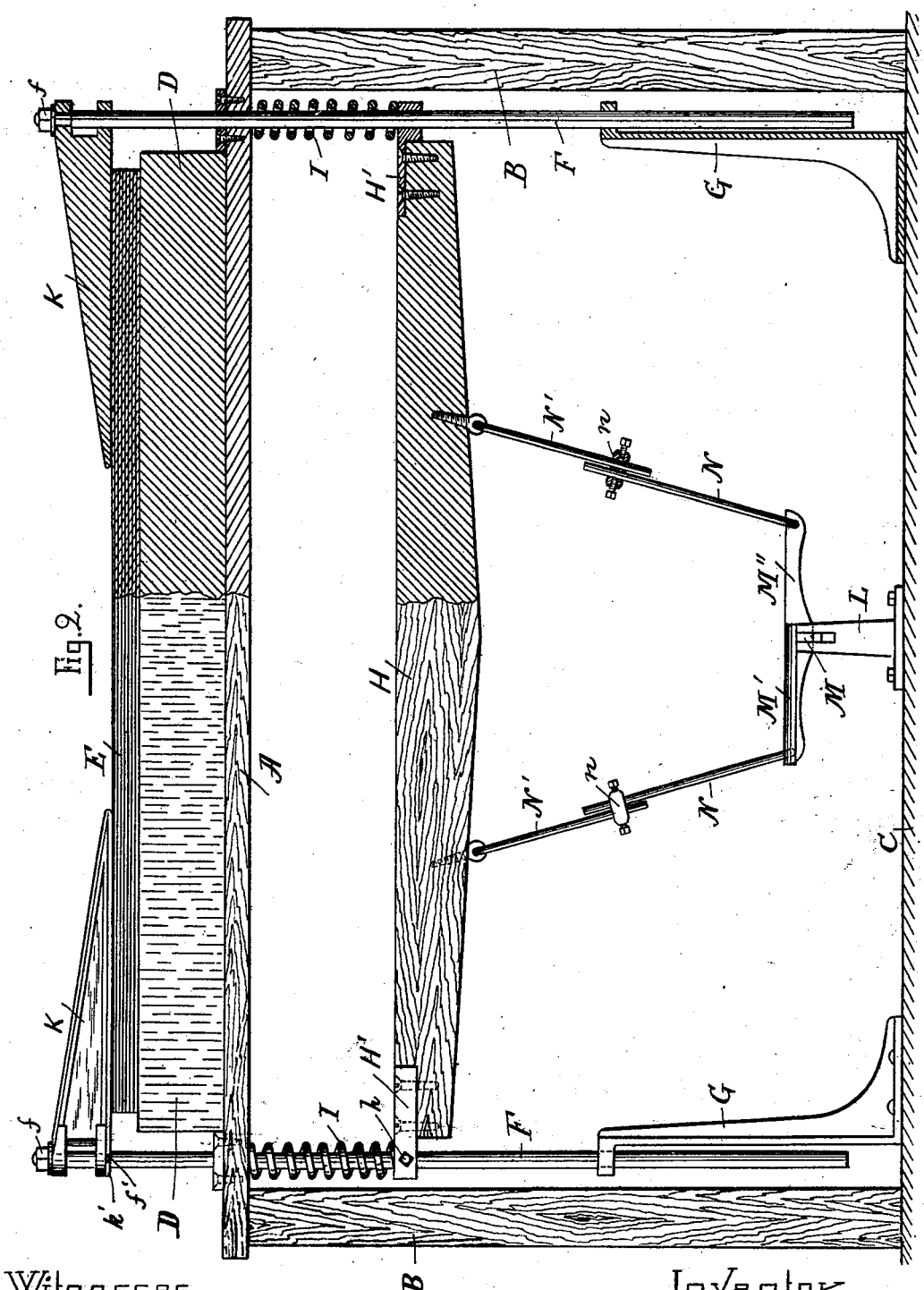

No. 715,642. Patented Dec. 9, 1902.
A. W. CURTIS.
CLAMPING DEVICE FOR CUTTING CLOTH.
(Application filed Apr. 19, 1902.)
(No Model.) 3 Sheets—Sheet 3.
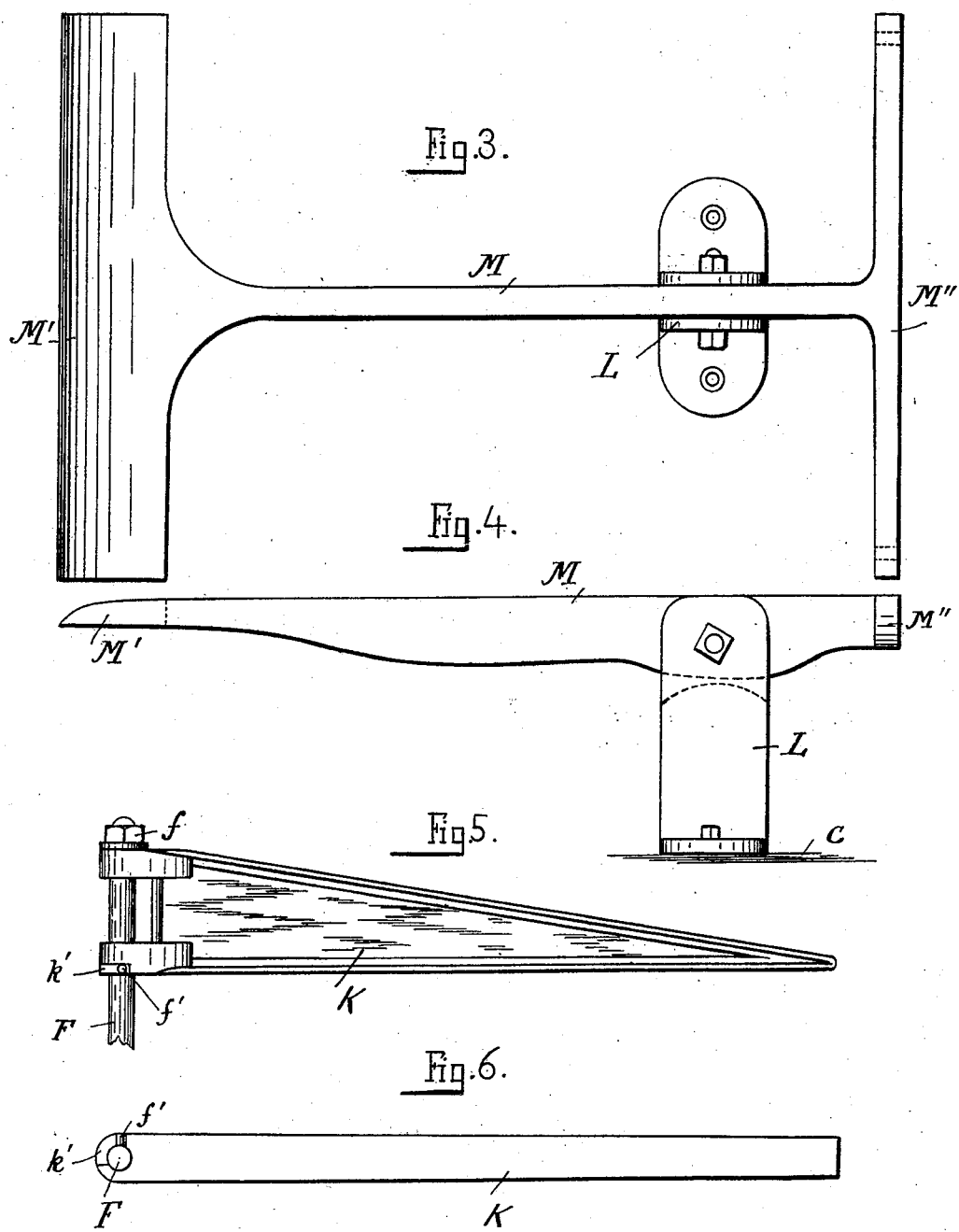

UNITED STATES PATENT OFFICE.

ARTHUR W. CURTIS, OF BEVERLY, MASSACHUSETTS, ASSIGNOR TO CHARLES F. LEE, OF BEVERLY, MASSACHUSETTS.

CLAMPING DEVICE FOR CUTTING CLOTH.

SPECIFICATION forming part of Letters Patent No. 715,642, dated December 9, 1902.

Application filed April 19, 1902. Serial No. 103,736. (No model.)

*To all whom it may concern:*

Be it known that I, ARTHUR W. CURTIS, a citizen of the United States, and a resident of Beverly, in the county of Essex and State of Massachusetts, have invented certain new and useful Improvements in Clamping Devices for Cutting Cloth, of which the following is a specification.

This invention relates to improvements in a clamping device for securing layers or thicknesses of cloth onto the upper surface of a cutting-board while cutting the thicknesses of cloth—such as, for instance, shoe-linings, serges, felting, &c.—and preventing the layers from slipping during the cutting operation. In devices of this kind the cloths have usually been held in place upon the cutting-board by means of heavy weights placed upon the top of the uppermost layer of the cloths, which weights have to be adjusted in position during the progress of the cutting operation. Such manner of holding the cloths in position is objectionable and inconvenient, besides requiring unnecessary waste of time in changing the positions of the weights from time to time during the adjustment of the cloths upon the cutting-board.

My invention is designed for the purpose of obviating such objections, and in my device I make use of a pair of spring-pressed clamps normally held onto the cloth by the agency of springs. Such clamps are released from the cloth by means of a foot-treadle and intermediate connecting mechanism whenever it is desired to change the position of the cloth on the cutting-board, as will hereinafter be more fully shown and described, reference being had to the accompanying drawings, wherein—

Figure 1 is a top plan view of the invention. Fig. 2 is a front elevation, partly shown in section. Fig. 3 is a detail top plan view of the foot-treadle device. Fig. 4 is a side view of Fig. 3. Fig. 5 is a detail side elevation of one of the clamps, and Fig. 6 is a bottom plan view of Fig. 5.

Similar letters refer to similar parts wherever they occur on the different parts of the drawings.

In Figs. 1 and 2, A represents an ordinary bench or table, on which B B are the legs or supports resting on the floor C, as usual.

D is the cutting-board, supported on the bench A, as usual.

E E represent the layers of cloth, &c., placed upon the cutting-board D in the ordinary manner.

Through perforations in the bench A is guided a pair of pressure-rods F F, the lower portions of which are guided in metal brackets G G, secured to the floor C, as shown.

Below the bench A is located a beam H, preferably provided at its ends with metal rod-holders H' H', adjustably secured to the rods F F, preferably by means of set-screws $h\ h$, as shown.

I I are coiled springs located on the rods F F between the under side of the bench A and upper ends of the rod-holders H' H', as shown in Fig. 2.

To the upper end of each of the vertically-movable rods F is connected a metal clamp K, preferably by means of a nut $f$. (Shown in Figs. 1, 2, and 5.)

The coiled springs I I serve as means for holding the clamps K K with proper pressure against the cloths E, resting on the cutting-board D, as shown in Figs 1 and 2, thus holding such cloths firmly in position upon the said cutting-board during the cutting operation.

For the purpose of raising the clamps K K above the cloths E whenever it is desired to change the position of the cloths on the cutting-board as the cutting operation proceeds I make use of a treadle mechanism connected to the beam H, as follows: To the floor C is secured a bracket L, to which is pivotally connected a treadle-lever M, provided at its forward end with a foot-piece M' and having a cross-bar M'' at its rear end. To the ends of such cross-bar are pivotally connected rods N N, adjustably connected, by means of suitable couplings $n\ n$, to rods N' N', the upper ends of which are pivotally connected to the beam H, as shown in Fig. 2. By means of such adjustable connecting-rods N N' N N' the position of the beam H may be adjusted relative to the springs I I on the rods F F, so as to obtain the proper tension on the springs I I, according to the pressure with which the clamps K K are desired to hold the cloths against the cutting-board during the cutting operation.

The clamps K K are pivotally connected on the upper ends of the pressure-rods F F and may be swung in a horizontal direction from the normal positions shown in full lines in Fig. 1 in direction of arrows to the inoperative positions shown in dotted lines in said Fig. 1. The object of such adjustment of the clamps is to enable the operator to swing said clamps to one side, as shown in dotted lines in Fig. 1, whenever it is desired to place a new series of cloths on the cutting-board. Previous to such adjustment of the clamps the operator depresses the treadle M', causing the rods F F to be raised, and thereby causing the clamps to be raised free from the cloths, after which the operator swings the clamps to the position shown by dotted lines in Fig. 1, and while held raised and swung sidewise the operator places the series of cloths upon the cutting-board, and when in position the clamps are swung to their normal position. (Shown in full lines in Fig. 1.) The operator then relieves the pressure on the treadle, when the springs I I cause the clamps to be automatically depressed and held with proper pressure onto the cloth, thus preventing it from slipping during the cutting operation. The clamps are prevented from swinging forward beyond the positions shown in full lines in Fig. 1 when clamped onto the cloth, thus preventing the cloth from sliding or slipping forward during the cutting operation, and this is essential, as the operator, usually cuts the cloth by moving the cutting-knife toward him, or nearly so. For such purpose I secure to each rod F a pin $f'$, projecting into a cut-away portion or recess $k'$ on the under side of the hub of each clamp K, as shown in Figs. 2, 5, and 6, and by such arrangement the swinging motion of each clamp is limited to the positions shown, respectively, in full and dotted lines in Fig. 2.

In the drawings, Fig. 1, I have shown the clamps turned toward the rear or away from the operator when such clamps are in their inoperative position; but I wish to state that if so desired said clamps may be swung forward when not in use and provided with a suitable locking device for holding them in their operative position without departing from the essence of my invention.

Having thus fully described the nature, construction, and operation of my invention, I wish to secure by Letters Patent and claim—

The herein-described clamping device for cutting-tables, consisting in combination, with a bench and cutter-block, a pair of spring-pressed clamps pivotally connected to vertically-adjustable pressure-rods, and having means substantially as described, for limiting the swinging motion of said clamps, guides for guiding said pressure-rods, a beam, connecting the latter, and a treadle mechanism, connected to said beam substantially as and for the purpose set forth.

In testimony whereof I have affixed my signature in presence of two witnesses.

ARTHUR W. CURTIS.

Witnesses:
ALBAN ANDRÉN,
THEKLA ANDRÉN.